United States Patent [19]

Wojslawowicz

[11] 4,037,195
[45] July 19, 1977

[54] VEHICULAR SIGNAL LIGHT CONTROL SYSTEM

[75] Inventor: Jack Edward Wojslawowicz, Bayonne, N.J.

[73] Assignee: RCA Corporation, New York, N.Y.

[21] Appl. No.: 751,172

[22] Filed: Dec. 16, 1976

[30] Foreign Application Priority Data

Jan. 26, 1976 United Kingdom ............... 2968/76

[51] Int. Cl.² .............................................. B60Q 1/00
[52] U.S. Cl. ..................................... 340/66; 340/81 F
[58] Field of Search ................... 340/66, 52 F, 81 F; 307/10 R, 10 LS

[56] References Cited

U.S. PATENT DOCUMENTS

| 3,742,447 | 6/1973 | Sognefest et al. ............... 307/10 LS |
| 3,925,757 | 12/1975 | Kimmelman ............................ 340/66 |
| 3,952,209 | 4/1976 | Shaklee et al. .................. 307/10 LS |

*Primary Examiner*—Donald J. Yusko
*Attorney, Agent, or Firm*—H. Christoffersen; A. L. Limberg; K. Watov

[57] ABSTRACT

A signal light control system for an automotive vehicle includes silicon-controlled-rectifiers of the gate-turn-off type (GTO), individual ones of which are used to selectively control the conduction of current to signal lamps mounted at the left-front, right-front, left-rear, and right-rear locations on the vehicle. A digital logic network is responsive to the conditions of the turn, hazard, and brake switches of the vehicle, and to the pulse train of a flasher circuit enabled during active conditions of the turn and hazard switches, for selectively applying appropriate control signals to the gate electrodes of the GTOs, to turn on and off the GTOs as required to operate the signal lamps during right and left turn conditions of the turn switch, braking of the vehicle, and the emergency condition of the hazard switch.

9 Claims, 4 Drawing Figures

GATE SIGNAL GENERATOR

VEHICULAR SIGNAL LIGHT CONTROL SYSTEM

The present invention is broadly related to automotive turn, brake, hazard signal systems, and is more specifically related to a signal light control system for an automobile including digital logic and semiconductor switches for controlling application of current to the lamp filaments. A silicon controlled rectifier of the gate turn off type called a GTO is particularly useful as the semiconductor switch element. It has a main current path between an anode and a cathode, and a gate electrode for receiving a first level of voltage for turning on the GTO (lowering the relative impedance of the anode-cathode main current path), or a second level of voltage for turning off the GTO (raising the relative impedance of the anode-cathode main current path). GTOs presently available respond to a positive level of voltage at their gate electrodes for enabling conduction of their anode-cathode current path, and respond to a ground or negative voltage at their gate electrode for turning-off and preventing conduction of current through their anode-cathode current path.

Present automotive systems for controlling the signal lights of a vehicle include electro-mechanical switches and electro-mechanical flashers for providing the turn switch, hazard switch, and brake switch functions. In the majority of such systems, the electrical contacts of the various switches must be capable of switching and carrying the full magnitude of current to the signal lamps of the vehicle. The standard signal lamps on automotive vehicles are incandescent and present a very low impedance load when first turned on, until the filament of the lamps heat up thereby raising the impedance of the lamp. So, when a particular switch is operated to supply current to a lamp, its contacts must initially be capable of transferring a very high in-rush current to the lamp, and the contacts must also be capable of switching the current from the lamp which provides an inductive load. When a switch is operated to interrupt current flow to the lamp, the inductive load presented by the lamp causes arching across the contacts of the switch as the switch opens, pitting and corroding the contacts and reducing their life expectancy. In addition to this reliability problem, relatively large gauge wire must be connected between the switches and the lamp, in order to safely conduct the relatively high magnitudes of current flowing therebetween. Accordingly, the cable bundles of the vehicles are undesirably bulky and are expensive to install.

The present invention is embodied in a signal light control system including silicon controlled rectifiers of the gate turn off type (GTO) at each corner of the vehicle, for selectively controlling the conduction of current to the lamps. The GTOs carry all of the current required to operate the lamps. The digital logic network controlled by the turn, hazard, and brake switches of the vehicle, selectively provides turn on and turn off signals to the gate electrodes of the GTOs for operating the lamps, in accordance with the various conditions of the turn, hazard and brake switches. Some of the advantages of the present inventive control system are that only small gauge wires need be cabled between the digital logic network and the GTOs, for carrying the relatively low magnitude of control current to operate the GTOs, and only a single power bus line need be run across the vehicle for supplying power to the GTOs. The turn, hazard, and brake switches can be very economically produced while maintaining long term reliability, since these switches now need only switch the low logic voltages and very low logic currents to the primarily resistive loads presented by the digital logic network.

Figure 1:
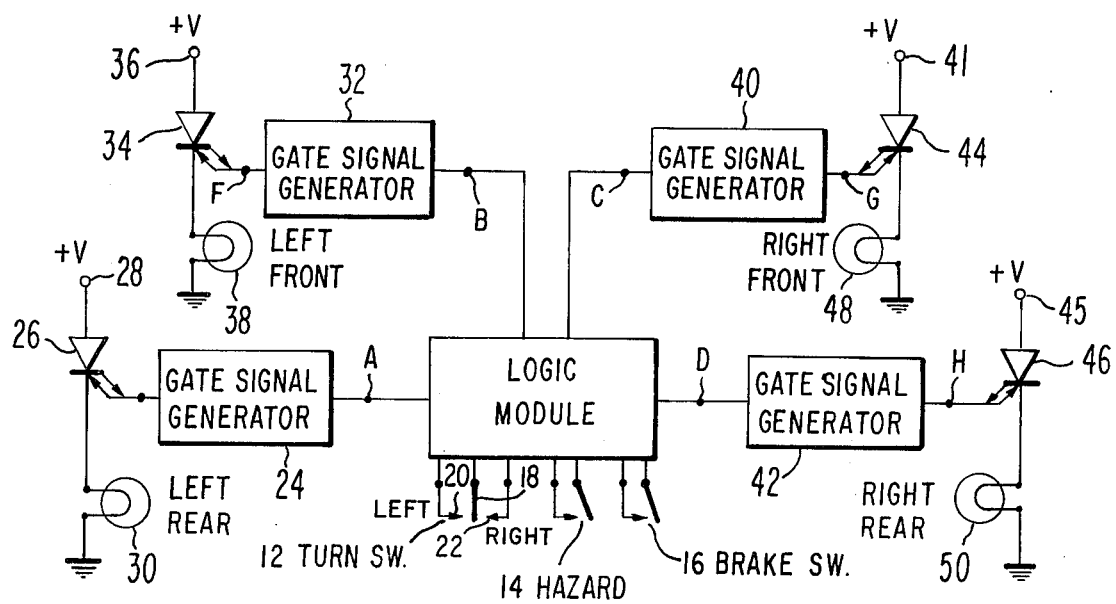
FIG. 1 is a block-schematic diagram showing one embodiment of the subject invention.

In FIG. 1, there is shown an embodiment of present signal light control system for use in an automotive electrical system having a negative ground. As shown, the logic module 10 is controlled by three switches, a turn switch 12, a hazard switch 14, and a brake switch 16. The basic operation of these elements and the other elements shown will now be given, with a more detailed description of an operation of each one of these elements to be given later.

If turn switch 12 is actuated to indicate a left turn, placing its pole 18 in electrical contact with its contact 20, logic module 10 will respond by producing a control signal at each one of the points A and B. This control signal is an alternating logic signal e.g., a pulse train, wherein each positive-potential pulse represents a digital 1, and each intervening zero-potential interval, represents a digital 0. Gate signal generator 24 responds to a positive potential at point A by producing a high-level lamp drive signal at point E for application to the gate electrode of the GTO 26. The anode-cathode current path of GTO 26 is thereby conditioned for conduction, so current flows from positive-voltage terminal 28, through the anode-cathode current path, to left-rear signal lamp 30, lighting the lamp. In turn, when the lamp drive signal at point E goes low or to ground, GTO 26 is turned off, interrupting current flow to lamp 30, turning it off. Alternating logic signals applied at point A cause lamp drive signal applied at point E from the gate signal generator 24 to alternate between high and low levels, turning GTO 26 alternatively on and off, causing the left-rear signal lamp 30 to blink. Similarly, the alternating logic signal at point B for the left-turn condition of the turn switch 12, causes the gate signal generator 32 to supply alternately high and low levels of left-front lamp drive signals at point F, for turning GTO 34 alternately on and off, causing left-front lamp 38 also to blink.

Similarly, for indicating a right turn, turn switch 12 is manually operated to place its pole 18 into electrical contact with its right turn contact 22. The logic module 10 responds by applying alternate logic signals to each one of points C and D, operating the gate signals generators 40 and 42, respectively, which apply alternately high and low level signals at points G and H, respectively, for alternately turning on and off GTOs 44 and 46, respectively, for blinking the right-front and right-rear lamps 48 and 50, respectively.

If the hazard switch 14 is manually operated to the closed position, its emergency conditions, logic module 10 will respond by applying alternating logic signals at points A, B, C and C. As described for the right- and left-turn conditions of turn switch 12, gate signal generators 34, 22, 40 and 42 will respond to the alternating logic signals at points A, B, C and D, respectively, by applying alternately high and low levels of signals at points E, F, G and H, respectively, for alternately turning on and off GTOs 26, 34, 44 and 46, respectively, causing all of lamps 30, 38, 48 and 50, to blink.

In response to actuation of the brakes of the vehicle, the contacts of brake switch 16 are closed, causing logic module 10 to apply a digital 1 at points A and D. In turn, gate signal generator 24 responds to the digital 1 at point A, producing a high level signal at point E that turns on GTO 26, causing lamp 30 to light. Similarly, gate signal generator 42 responds to the digital 1 at point D, by producing a high-level right-rear lamp drive signal at point H, turning on GTO 46, in turn causing right-rear lamp 50 to light. The left- and right-rear lamps 30, 50 will remain lit so long as the vehicle braking condition continues. When the brakes of the vehicle are released, the contacts of brake switch 16 are opened to a neutral condition. This causes logic module 10 to produce a digital 0 at points A and D, in turn causing the gate signal generators, 24, 42 to produce a ground signal at points E, H respectively, in turning off GTOs 26, 46, respectively, and left- and right-rear lamps 30, 50 respectively.

If turn switch 12 is placed in its left or right turn condition, concurrently with the hazard switch 14 being placed in its emergency condition (its contacts being closed), logic module 10 will respond by producing alternating logic control signals at points A, B, C and D, which as previously described cause blinking of lamps 30, 38, 48, 50, respectively. Regardless of the condition of the turn switch 12, if the hazard switch 14 is in its emergency position with its contacts closed, concurrent with the brake switch being in its braking condition with its contacts closed, the logic module 10 will respond by producing a digital 1 at points A, B, C and D. Gate signal generators 24, 32, 40 and 42, respond to respective ones of these signals to supply high level lamp drive signals at points E, F, G and H, respectively, turning on GTOs 26, 34, 44, 46, and lamps 30, 38, 48 and 50. If the turn switch 12 is in its left-hand turn condition, for blinking the left-front and left-rear lamps 38, 30, as previously described, and the brake switch 16 is placed in its braking condition, the logic module 10 will respond by applying a digital 1 input signal to the gate signal generator 42, for turning on right-rear signal lamp 50, as previously described. Conversely, if the turn switch 12 is operated to its right-hand-turn condition, for blinking right-front and -rear lamps 48, 50, as previously described, the logic module 10 will respond by producing a digital 1 control signal at point A, causing left rear lamp 30 to turn on, as previously described. In other words, logic module 10 is responsive to simultaneous activation of turn switch 12 and brake switch 16, by providing overriding control to the turn switch 12. If turn switch 12 and hazard switch 14 are concurrently activated or operated to active conditions, logic module 10 responds by providing the signalling corresponding to the emergency condition of hazard switch 14. Lastly, if the hazard switch 14, and brake switch 16 are concurrently in their emergency and braking conditions, respectively, regardless of the condition of turn switch 12, the logic module 10 responds by providing digital 1 control signals at A, B, C, D, for causing all of the lamps 30, 38, 48 and 50 to be constantly lit.

The operation of the logic module 10 for producing the appropriate logic level signals at points A, B, C and D, in response to operation of the switches 12, 14 and 16, will now be described in greater detail, with reference to FIG. 2. For the purposes of discussion, the neutral condition for turn switch 12 is defined as the condition where pole 18 is not contacting either of contacts 20 or 22, and the neutral conditions for hazard switch 14 and brake switch 16 are their open circuit conditions.

With brake, hazard, and turn switches 12, 14, 16, each in their neutral condition, the logic network shown will produce a digital 0 control signal (ground in this example) at points A, B, C and D, respectively, in the following manner. The positive voltage + V is applied to the input terminals of inverters 56, 57, 58, 59, via coupling resistors 60, 61, 62, 63, respectively, from terminals 52, 53, 54, 55 respectively. This causes each of the input signals applied to NAND gate 64 to be a digital 1 (about +V in this example), causing NAND gate 64 to supply a digital 0 signal (ground, in this example) to control terminal 66 of flasher or pulse generator 68, for maintaining flasher 68 in an off condition, so as digital 0 signal appears at its output terminal 70. Flasher 68 can be provided by any of a number of known circuits, such as an astable multivibrator, for example. In order to follow conventional logic notation in this description (logic 1 being a positive level, and logic 0 at ground), the output signal produced by inverter 57 at point J is defined as the output signal for the hazard switch 14; therefore, the complement of this output signal is at point K. Similarly, if the output signals produced by inverters 58 and 59 at points L and M, respectively, are considered the first and second output signals for the right and left turn conditions of the turn switch 12, respectively, then the complements of these output signals are produced at points N and P, respectively. Accordingly, with switches 14, 16 and 12, each in their neutral conditions, each of the NAND gates 72-78 receive at least one input signal at digital 0 or ground, causing each of these NAND gates 72-78 to produce a digital 1 as an output signal. Accordingly, NAND gates 80-83 each receive a digital 1 signal at its input terminal, causing them to produce digital 0 output signals at points A, B, C and D respectively.

When turn switch 12 is placed in its right turn condition with pole 18 switched to contact 22, a digital 0 is applied to point N causing inverter 58 to produce a digital 1 output signal at point L so NAND gate 64 will apply a digital 1 signal to the control terminal 66 of flasher 68, causing flasher 68 to produce a pulse train of alternating logic signals at its output terminal 70. NAND gate 77 is now primed by the digital 1 signal at point L for producing an alternating logic output signal in response to the pulse train from flasher 68. NAND gates 82 and 83 receive output signal from NAND gate 77, and in response thereto, produce an alternating logic output signal at points C and D, respectively.

The operation when turn switch 12 is placed in its left turn condition with pole 18 switched to contact 20, with the brake and hazard switches 16, 14 in their neutral conditions, can be described by syntactic similarity to the above-described operation when turn switch 12 is placed in its right turn condition with its pole 18 switched to contact 22, by substituting reference numerals and letters P, 59, M, 74, 80, 81, A, B, for N, 58, L, 77, 83, 82, D, C, respectively.

When the brakes of the vehicle are actuated, a linkage 85 causes the pole of brake switch 16 to be moved into electrical contact with its associated contact, placing brake switch 16 in its braking condition. Assuming that the other switches 14 and 12 are in their neutral conditions, inverter 56 will respond by applying a digital 1 input signal to each one of the NAND gate 72, 73 and 78. In turn, NAND gates 73 and 78 will respond by applying a digital 0 signal to an individual input terminal of the NAND gates 80 and 83, respectively. NAND gates 80 and 83 respond to this or other 0 input signal by producing a digital 1 output signal at points A and D, respectively, for operating gate signal generators 24, 42, respectively, for turning on GTO 26 to light lamp 30, and GTO 46 to light lamp 50, respectively. If while brake switch 16 is in its brake condition, turn switch 12 is placed in its right turn condition, NAND gate 78, in response to the 0 signal now at point N, changes its output signal from a 0 to a 1 level, priming NAND gate 83 for producing an alternating logic signal at point D in response to the alternating logic output signal which is supplied from NAND gate 77 as described above for turn switch 12 being in its right-turn position. Similarly, with brake switch 16 in its braking condition, if turn switch 12 is placed in its left-turn condition, the signal at point P changes from a 1 to a 0. In response to this change, NAND gate 73 changes its output signal from a digital 0 to a digital 1, priming NAND gate 80 for responding to the alternating logic input signal received from NAND gate 74 for producing an alternating logic output signal at point A.

Assuming that brake switch 16 and turn switch 12 are each in their neutral conditions, if hazard switch 14 is manually closed to place it in its emergency conditions, a 0 or ground signal is applied to point K, and in response thereto the following takes place. Inverter 57 produces a digital 1 at point J. NAND gate 73 applies a 1 input signal to NAND gate 80. NAND gate 78 applies a 1 input signal to NAND gate 83, and NAND gate 64 applies a 1 or turn on signal to the control terminal 66 of flasher 68, causing flasher 68 to produce an alternating logic signal pulse train at its output terminal 70.

The 1 signal at point J will prime NAND gates 75 and 76, for responding to the pulse train from flasher 70. Accordingly, NAND gate 75 applies an alternating logic input signal to each one of the NAND gates 80 and 81, and NAND gate 76 applies an alternating logic input signal to each one of the NAND gates 82 and 83. This, in turn causes NAND gates 80-83 to produce alternating logic signals at points A, B, C and D, respectively.

If hazard switch 14 is in its emergency condition, brake switch 16 in its neutral condition, and turn switch 12 is placed in its right-turn condition switching pole 18 to contact 22, NAND gate 76 responds to the change in signal at point N from a 1 to a 0, to apply a digital 1 input signal to NAND gate 82 and 83. NAND gate 77 is primed by the concurrent 1 signal at point L, for responding to the pulse train from flasher 68 to apply an alternating logic input signal to both of the NAND gates 82 and 83, so they supply alternating logic signal to points C and D, respectively. Note that at the same time NAND gates 80 and 81 are producing alternating logic signals at A and B, as previously described, for closure of switch 14 concurrent with the switches 16 and 12 being in their neutral conditions. Similarly, with brake switch 16 in its neutral condition and hazard switch 14 in its emergency condition, when turn switch 12 is in its left turn position with pole 18 switched to contact 20, the 0 signal at point P will cause NAND gate 75 to apply a 1 signal to input terminals of NAND gates 80 and 81 respectively for priming NAND gates 80 and 81. Concurrently, the 1 signal at point M will prime NAND gate 74 for responding to the pulse train from flasher 68 to apply alternating logic input signals to each of the NAND gates 80 and 81, the latter two gates responding by producing alternating logic signals at points A and B, respectively. Note that at this time NAND gates 82 and 83 are producing alternating logic signals at C and D, as previously described for the neutral conditions of switches 12 and 16, concurrent with the emergency condition for switch 14.

With brake switch 16 being in its braking condition concurrent with hazard switch 14 being in its emergency condition, logic 1 signals will be produced at points Q, J, by inverters 56, 57, respectively. NAND gate 72 receives these signals at points Q and J as individual input signals, and in response thereto applies a 0 signal to an individual input terminal of each of the NAND gates 80–83. NAND gates 80–83 respond by producing a logic 1 signal at points A, B, C and D, respectively. This signal condition prevails whenever brake switch 16 is in its braking condition concurrent with hazard switch 14 being in its emergency condition, regardless of the condition of turn switch 12.

Figure 3:
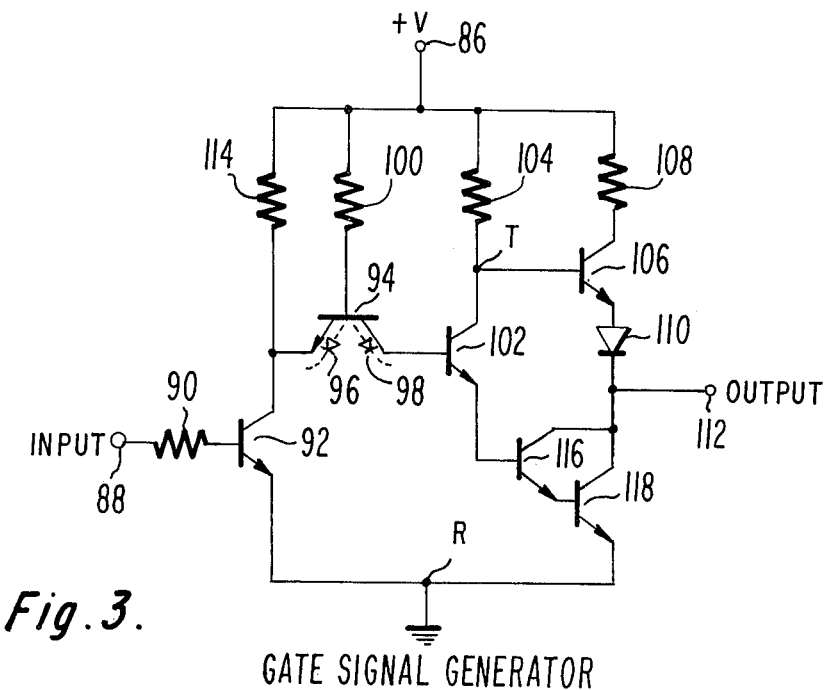
FIG. 3 is a schematic diagram of a representative logic circuit, for providing the gate signal generator function.

Each of the gate signal generators 24, 32, 40, and 42 has the same circuit, shown in FIG. 3. A voltage +V is applied to terminal 86, and point R is grounded. Assume that a digital 1 input signal is applied to input terminal 88. This signal is applied by a base current limiting resistor 90 to the base electrode of NPN transistor 92. Since in this example, a digital 1 signal is represented by a positive level of signal, it is assumed that this level is high enough to turn on transistor 92, enabling conduction of its collector-emitter current path, for substantially connecting the emitter electrode of NPN transistor 94 to ground. The equivalent diodes 96 and 98 provided by the base-emitter and base-collector junctions, respectively, of transistor 94 are shown in phantom. With its emitter now grounded, the base-emitter junction 96 and base-collector junction 98 are each forward biased, permitting current to flow from terminal 86 substantially through the current path including base current limiting resistor 100, the base-emitter junction of transistor 94 (in essence through the diode 96, now forward biased), and the collector-emitter path of transistor 92, to ground. At this time the diode 98 formed by the base-collector junction of transistor 94 is substantially current starved (the current being drawn away via diode 96), preventing the flow of base current into the base electrode of transistor 102, causing this transistor to be substantially cutoff. This causes point T to be substantially at +V via the coupling provided by base current limiting resistor 104 and relatively high collector-emitter path impedance of transistor 102, permitting base current to flow from terminal 86 through resistor 104 into the base electrode of transistor 106, turning on transistor 106. When transistor 106 so turns on, current is conducted from terminal 86 through limiting resistor 108, the collector-emitter current path of transistor 106, the anode-cathode electrodes of diode 110, and into output terminal 112. This current flows from output terminal 112 into the gate electrode of the respective on of the GTOs 26, 34, 44, 46, that the output terminal 112 is connected to, for turning on the GTO, as previously described. Of course, at this time, the resultant voltage applied to output terminal 112 will be equal to the supply voltage +V minus the voltage drops across resistor 108 and diode 110, and the low value of $V_{CE}$ between the collector-emitter electrodes of transistor 106 associated with saturated conduction. When transistor 92 is turned on, resistor 114 limits the magnitude of the collector current flowing through transistor 92. If the input signal applied to input terminal 88 is changed from the positive value of voltage associated with a digital 1 in this example, to the ground potential associated with a digital 0 in this example, transistor 92 responds by turning off, substantially raising its impedance between its collector and emitter electrodes. With transistor 92 turned off, resistor 114 now serves to back bias the base-emitter junction of transistor 94, by coupling +V to the emitter electrode of this transistor. In other words, with transistor 92 turned off, the voltage +V is applied to the emitter electrode of transistor 94 for back biasing the base-emitter junction diode 96, preventing the conduction of current through the current path formed by this diode. The collector-base junction of transistor 94 is forward biased causing transistor 94 to operate in the inverted mode. Current is now delivered to the base electrode of transistor 102 via the conduction path including resistor 100 and the forward biased base-collector junction of transistor 94 (i.e. diode 98), causing transistor 102 to be turned on. When transistor 102 so turns on, the impedance between its collector and emitter electrodes is reduced to a relatively low value for conducting current to the base electrode of transistor 116 from terminal 86 via the current path through resistor 104 and the collector-emitter path of transistor 102. Transistor 116 is connected in a Darlington circuit with transistor 118. Accordingly, when transistor 116 is turned on, by application of current to its base electrode it delivers emitter current to the base electrode of transistor 118. This turns transistor 118 on, so the impedance between its collector-emitter electrode is reduced to a relatively low value, causing output terminal 112 to be connected substantially to ground. If at the time output terminal 112 is so grounded, its associated GTO 26, 34, 44 or 46 is turned on, or conductive, anode current is initially diverted from the GTO into its gate electrode, therefrom into the output terminal 112 and through the collector-emitter current path and transistor 118 to ground, initiating turn off of the GTO. As the GTO begins to turn off, current then flows from the respective signal lamp in the cathode circuit of the GTO, through the cathode-gate current path of the GTO and into output terminal 112 to ground via transistor 118, completing the turn off of the GTO. It is well known that cathode loaded GTOs turn off in the manner described when their gate electrodes are connected substantially to ground or a negative voltage.

Figure 2:
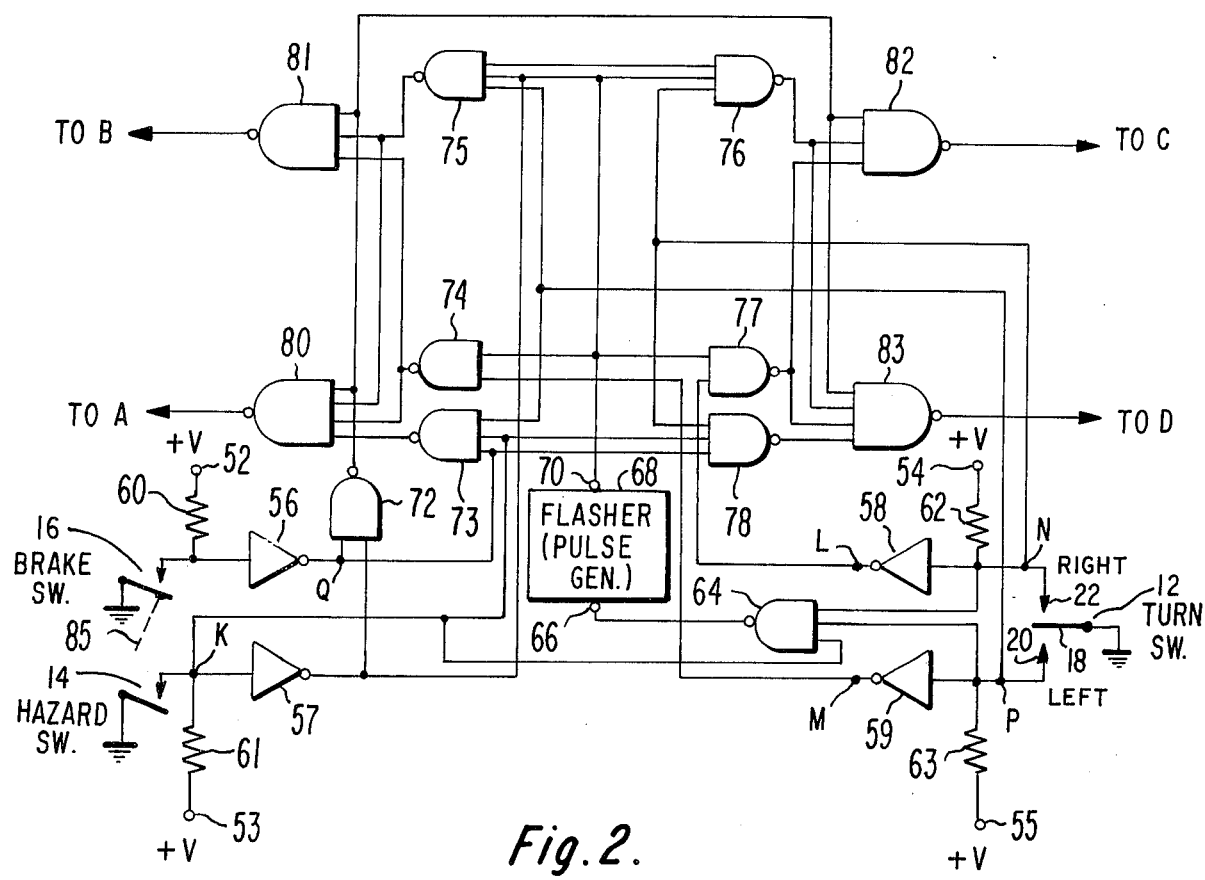
FIG. 2 is a schematic diagram of one embodiment of the digital logic module.
Figure 4:
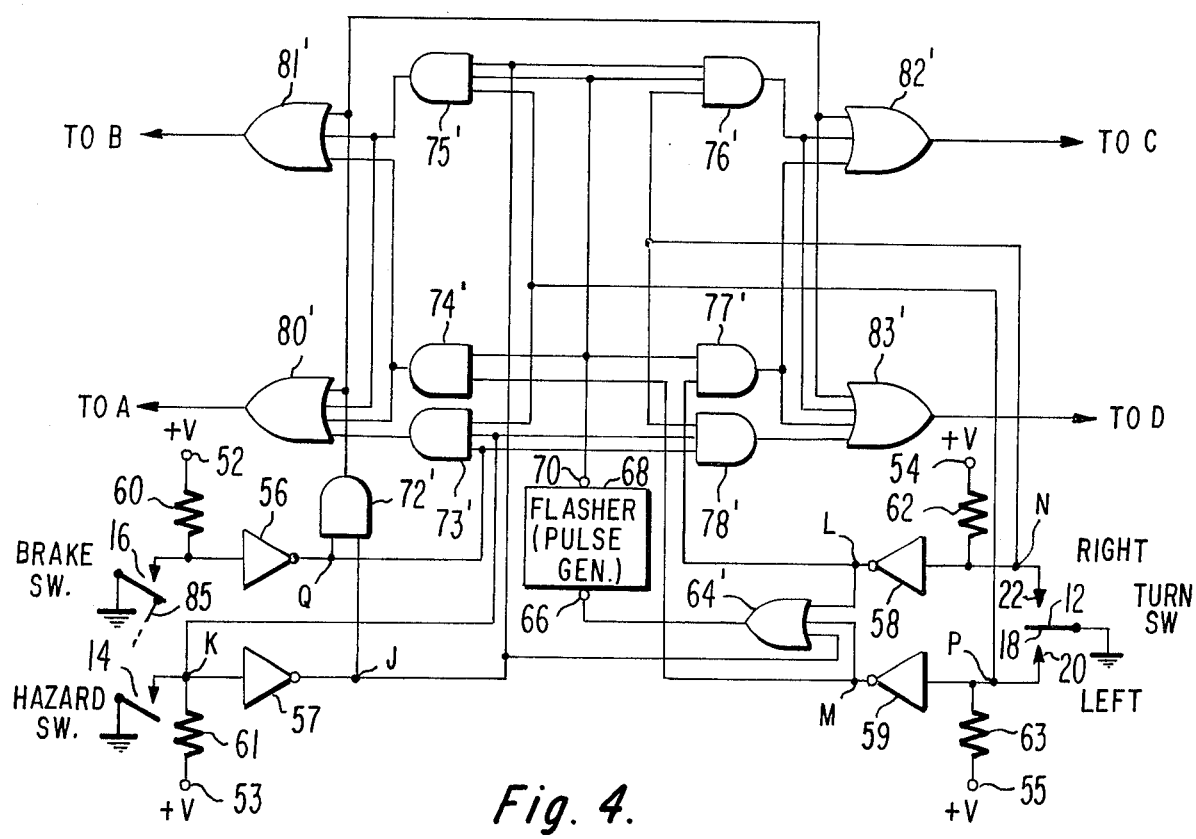
FIG. 4 is a schematic diagram of a logic circuit functionally equivalent to the logic circuit shown in FIG. 2.

In FIG. 4, the NAND gates shown in FIG. 2 have been replaced by their respective AND and OR gate functional equivalents. In other words, comparing FIG. 4 to FIG. 2, OR gates 80'-83° are substituted for NAND gates 80-83, AND gates 72'-78' are substituted for NAND gates 72-78, and OR gate 64' is substituted for NAND gate 64. Note that the input signals applied to OR gate 64' are the complements of the input signals applied to NAND gate 64. The remaining elements between the circuits of FIG. 4 and FIG. 2 are identical. Of course, operation of the circuit of FIG. 2 and FIG. 4 are substantially identical.

It should be noted that a PNP power transistor can be substituted for each one of the GTOs 26, 34, 44 and 46. If such a substitution is made, four inverters would also have to be added to the circuit, a single inverter being connected between each one of the points E, F, G and H, and the base electrode of its associated PNP power transistor. In addition, for automotive use, since the collector-electrodes of almost all power transistors are connected to their case, special isolation sockets for the PNP transistors would have to be used to isolate their collector electrodes from ground. The respective emitter electrodes of each one of the power transistors would be connected individually to terminals 28, 36, 41, 45, respectively, for receiving the positive voltage +V, and the respective collector electrodes of these transistors would be connected individually to one terminal of the signal lamps 30, 38, 48, 50, respectively, the other terminals of the signal lamps being grounded. Obviously, for cost considerations, although a PNP power transistor and an inverter can be directly substituted for each one of the GTOs 26, 34, 44 and 46, as previously described, it is preferred to use the GTOs.

An NPN power transistor can also be directly substituted for each one of the GTOs 26, 34, 44, 46 without requiring additional inverters, as with the substitution of PNP power transistors for the GTOs. In such case, the lamps 30, 38, 48 and 50, would be emitter loads for their respective NPN power transistors, the collector electrodes of these transistors being connected individually to terminals 28, 36, 41, 45, respectively, for receiving the voltage +V, and their respective base electrodes being directly connected to points E, F, G, and H, respectively. The disadvantage of substituting NPN power transistors for the GTOs is that because of the voltage drop across the lamps, the base current to turn on each one of the transistors would almost have to be the full supply current for the lamps, in order to fully turn on the transistors for obtaining maximum brilliance of the lamps (that is, for applying substantially the voltage +V or battery voltage across the lamps). Accordingly, because of the base-emitter junction voltage drop across the power transistor, when turned on, and because of the turn on problem, lamps with special filaments would have to be used, to obtain a satisfactory level of light output. Again, this may be cost prohibitive, and demonstrates the preference for the use of GTOs in the present circuits.

There are other problems associated with substituting power transistors for GTOs. For example, when a particular lamp turns on, the initial in-rush or surge current drawn by the lamp is about ten times the current drawn by the lamp when it has attained its nominal operating level. Power transistors capable of handling such levels of current are expensive in comparison to a GTO. Also, the GTO's do not require high gate current drive for turn on, whereas power transistors require relatively high base currents for turn on. In summation, although power transistors can be substituted for the GTOs, it is preferable at present, both for technical and economical reasons, the GTOs be used in the present circuit.

What is claimed is:

1. An electronic signal light control systems for selectively controlling the conduction of current to first through fourth signal lamps at the left front, right front, left rear, and right rear locations of a vehicle, respectively, comprising:
  turn switch means normally in a neutral condition, being manually operable to a left turn condition, for operating said control system to blink the first and third signal lamps, or to a right turn condition, for operating said control system to blink said second and fourth lamps;

hazard switch means normally in a neutral condition, being manually operable to an emergency condition, for operating said control system to blink said first through fourth signal lamps;

brake switch means normally in a neutral condition, being operable to a braking condition in response to actuation of the brakes of said vehicle, for operating said control system to turn on said third and fourth signal lamps;

flasher means responsive to the emergency condition of said hazards switch means, for producing a pulse train of alternate logic signals, or responsive to the left or right turn conditions of said turn switch means, for producing the pulse train;

first digital logic network means responsive to the pulse train of said flasher means and to the left turn condition of said turn switch means, for providing left front and left rear lamp drive signals, said first digital logic network means responsive to said pulse train and to the right turn condition of said turn switch means, for providing right front and right rear lamp drive signals, each one of the drive signals having alternate and successive first and second levels of voltage;

second digital logic network means responsive to the emergency condition of said hazard switch means and to the pulse train of said flasher means, for providing concurrently said left front, left rear, right front, and right rear lamp drive signals, each having alternate and successive first and second levels of voltage;

third digital logic network means responsive to the braking condition of said brake switch means, for providing said right and left rear lamp drive signals each at the first level of voltage; and first through fourth current control means, each having a respective main current path for selectively conducting current to said first through fourth lamps, respectively, and a respective control electrode for receiving said left front, right front, left rear and right rear lamp drive signals, respectively, the main current path of each one of said first through fourth current control means having a relatively high impedance in response to intervals of its respective lamp drive signal that are at the second level of voltage, the main current path of each one of said first through fourth current control means having a relatively low impedance in response to intervals of its respective lamp drive signal that are at the first level of voltage thereby permitting current to be conducted to its associated one of said first through fourth lamps.

2. The signal light control system of claim 1, wherein said first through fourth current control means each includes a silicon controlled rectifier of the gate-turn-off type having anode-cathode electrodes forming said main current path, and a gate electrode as said control electrode.

3. The signal light control system of claim 1, wherein said turn switch means produces a first output signal in its left turn condition, and a second output signal in its right turn condition, and wherein said first digital logic network means includes:

first and second gating means each responsive to an input signal, for producing the left front and left rear lamp drive signals, respectively, third gating means receiving as input signals the first output signal, and the pulse train of said flasher, for applying when its input signals are present concurrently, an alternating logic input signal to said first and second gating means;

fourth and fifth gating means each responsive to an input signal, for producing the right front and right rear lamp drive signals, respectively; and sixth gating means receiving as input signals the second output signal, and the pulse train of said flasher, for applying when its input signals are present concurrently, an alternating logic input signal to said fourth and fifth gating means.

4. The signal light control system of claim 3, wherein said second digital logic network means includes:

said hazard switch means in its emergency condition producing a third output signal; and seventh and eighth gating means each receiving as input signals the third output signal, and the pulse train of said flasher means, said seventh gating means also receiving as an input signal the complement of the first output signal, said eighth gating means also receiving as an input signal the complement of the second output signal, said seventh gating means for applying when all of its input signals are concurrently present an alternating logic input signal to both said first and second gating means, and said eighth gating means for applying when all of its input signals are present concurrently an alternating logic input signal to both said fourth and fifth gating means.

5. The signal light control system of claim 3, wherein said hazard switch means in its emergency condition produces a third output signal, and said brake switch means in its braking condition produces a fourth output signal, and wherein said third digital logic network means includes:

seventh and eighth gating means each receiving as input signals the fourth output signal, and the complement of the third output signal, said seventh gating means also receiving as an input signal the complement of the first output signal, said eighth gating means also receiving as an input signal the complement of the second output signal, said seventh and eighth gating means for applying when their respective input signals are present concurrently an individual input signal to said second and fifth gating means, respectively.

6. The signal light control system of claim 1, further including:

fourth digital logic network means, responsive to the braking condition of said brake switch means and the emergency condition of said hazard switch means simultaneously occurring for producing the left front, left rear, right front, and right rear lamp drive signals each at the first level of voltage.

7. The signal light control system of claim 6, wherein said brake switch in its braking condition produces a first output signal, and said hazard switch means in its emergency condition produces a second output signal and wherein said fourth digital logic network means includes:

first through fourth gating means each responsive to a respective input signal, for producing the left front, left rear, right front, and right rear lamp drive signals; and fifth gating means receiving as individual input signals the first and second output signals, for applying when the input signals are present concurrently an input signal substantially simultaneously to said first through fourth gating means.

8. A vehicular signal light control system comprising:

first through fourth signal lamps at the left front, right front, left rear, and right rear locations of a vehicle, respectively;

turn switch means operable to a left turn condition, for producing a first output signal, and to a right turn condition, for producing a second output signal;

hazard switch means operable to an emergency condition, for producing a third output signal;

brake switch means operable to a braking condition in response to actuation of the brakes of said vehicle, for producing a fourth output signal;

flasher means responsive to the emergency condition of said hazard switch means, for producing a pulse train of alternate logic signals, or responsive to the left and right turn conditions of said turn switch means, for producing the pulse train;

first through fourth gating means each individually responsive to a respective input signal, for producing a respective control signal having a first level of voltage, and each responsive to the absence of an input signal for changing the level of its control signal to a second level of voltage;

fifth gating means receiving as input signals the complement of the third output signal, the fourth output signal, and the complement of said first output signal, responsive to the simultaneous occurrence of all its input signals to supply an input signal to said third gating means;

sixth gating means receiving as input signals the complement of the third output signal, the fourth output signal, and the complement of said second output signal, responsive to the simultaneous occurrence of all its said input signals to supply an input signal to said fourth gating means;

seventh gating means receiving as input signals the first output signal, and the pulse train of said flasher means, responsive to the simultaneous occurrence of all its said input signals to supply an alternating logic input signal to both said third and first gating means;

eighth gating means receiving as input signals the second output signal of said turn switch means, and the pulse train of said flasher means, responsive to the simultaneous occurrence of all its said input signals to supply an alternating logic input signal to both said second and fourth gating means;

ninth and tenth gating means each receiving as input signals the pulse train of said flasher means, and the third output signal, and individually receiving as another input signal the complements of the first and second output signals, respectively, said ninth gating means responsive to the simultaneous occurrence of all its input signals to supply an alternating logic input signal to both said first and third gating means, said tenth gating means responsive to the simultaneous occurrence of all its input signals to supply an alternating logic input signal to both said second and fourth gating means;

eleventh gating means receiving as input signals the third and fourth output signals, responsive to the simultaneous occurrence of all its input signals to supply an input signal to each of said first through fourth gating means; and first through fourth current control means, each having a respective main current path for selectively conducting current to said first through fourth lamps, respectively, and a respective control electrode for receiving individually control signals from said first through fourth gating means, respectively, the main current paths of each one of said first through fourth current control means each having a relatively low impedance for an associative control signal at said first level of voltage, and a relatively high impedance for an associative control signal at said second level of voltage.

9. The signal light control system of claim 8, wherein said first through fourth current control means each includes a silicon controlled rectifier of the gate-turn-off type having anode-cathode electrodes comprising the main current path, and a gate electrode as said control electrode.

* * * * *